(12) United States Patent
Nordstrom

(10) Patent No.: US 8,328,140 B2
(45) Date of Patent: Dec. 11, 2012

(54) SYSTEM FOR TRANSPORTATION OF GOODS IN A LOADING SPACE

(75) Inventor: Claes Nordstrom, Lund (SE)

(73) Assignee: ConveyEx AB, Bjarred (SE)

( * ) Notice: Subject to any disclaimer, the term of this patent is extended or adjusted under 35 U.S.C. 154(b) by 175 days.

(21) Appl. No.: 12/593,278

(22) PCT Filed: Mar. 19, 2008

(86) PCT No.: PCT/SE2008/050308
§ 371 (c)(1), (2), (4) Date: May 10, 2010

(87) PCT Pub. No.: WO2008/118076
PCT Pub. Date: Oct. 2, 2008

(65) Prior Publication Data
US 2010/0243813 A1    Sep. 30, 2010

(30) Foreign Application Priority Data

Mar. 27, 2007    (SE) ...................................... 0700776

(51) Int. Cl.
*B64C 1/22* (2006.01)
*B64D 1/08* (2006.01)
*B64D 9/00* (2006.01)

(52) U.S. Cl. .................................... 244/137.1; 198/594

(58) Field of Classification Search ............... 244/137.1, 244/118.1, 118.2, 137.2; 198/594, 588, 790, 198/812, 861.1
See application file for complete search history.

(56) References Cited

U.S. PATENT DOCUMENTS
2,913,029 A    7/1954    Paton
(Continued)

FOREIGN PATENT DOCUMENTS
GB    417246 A    12/1932
(Continued)

*Primary Examiner* — Tien Dinh
*Assistant Examiner* — Michael A Fabula
(74) *Attorney, Agent, or Firm* — Tarolli, Sundheim, Covell & Tummino LLP

(57) ABSTRACT

The present invention relates to a system for transportation of goods in a loading space. The system comprises a conveyor (1) for goods which is drivable to and for in the loading space. To provide a quickly and easily fittable system for transportation of goods which is of low weight and easy to work with, the conveyor comprises a first element (3) with a goods-bearing belt and with a wall (6) disposed transversely to the driving directions of the conveyor, the goods-bearing belt being fastened to the wall via a first end portion, the wall being movable between a first extreme position (A) at or in the vicinity of an aperture to the loading space and a second extreme position at a far end of the loading space from said aperture, and a second element (4) disposed at or in the vicinity of the aperture to the loading space as a continuation of said first element of the conveyor, to which second element the goods-bearing belt is fastened via a second end portion and, during movement of said transverse wall between said extreme positions, is unwindable and windable about two elongate rollers (7, 8) supported for rotation in the vehicle at a distance from one another, so that the instantaneously uppermost strand of the goods-bearing belt wound about the rollers serves as a movable loading and unloading surface for goods between said rollers. The conveyor (1) is also configured to allow movement of the transverse wall (6) between said extreme positions and thus at the same time to unwind or wind the goods-bearing belt.

23 Claims, 5 Drawing Sheets

U.S. PATENT DOCUMENTS

| | | |
|---|---|---|
| 3,349,574 A | 10/1967 | Glaser |
| 3,474,803 A | 10/1969 | Davis |
| 3,548,904 A | 12/1970 | Mackell |
| 3,552,466 A | 1/1971 | Fairchilds |
| 3,999,727 A | 12/1976 | Rennemann |
| 4,162,735 A | 7/1979 | Lewis |
| 4,842,471 A | 6/1989 | Hodgetts |
| 5,046,690 A | 9/1991 | Nordstrom |
| 5,170,968 A * | 12/1992 | Helmner .................... 244/137.1 |
| 6,367,615 B1 * | 4/2002 | Helmner .................... 198/750.1 |
| 6,679,371 B2 * | 1/2004 | Hooijen et al. ............ 198/750.1 |
| 2005/0224658 A1 * | 10/2005 | Nordstrom ................. 244/137.1 |

FOREIGN PATENT DOCUMENTS

| | | |
|---|---|---|
| GB | 1191921 | 11/1967 |
| WO | 03101853 | 12/2003 |
| WO | WO-2005/028248 A1 | 3/2005 |

* cited by examiner

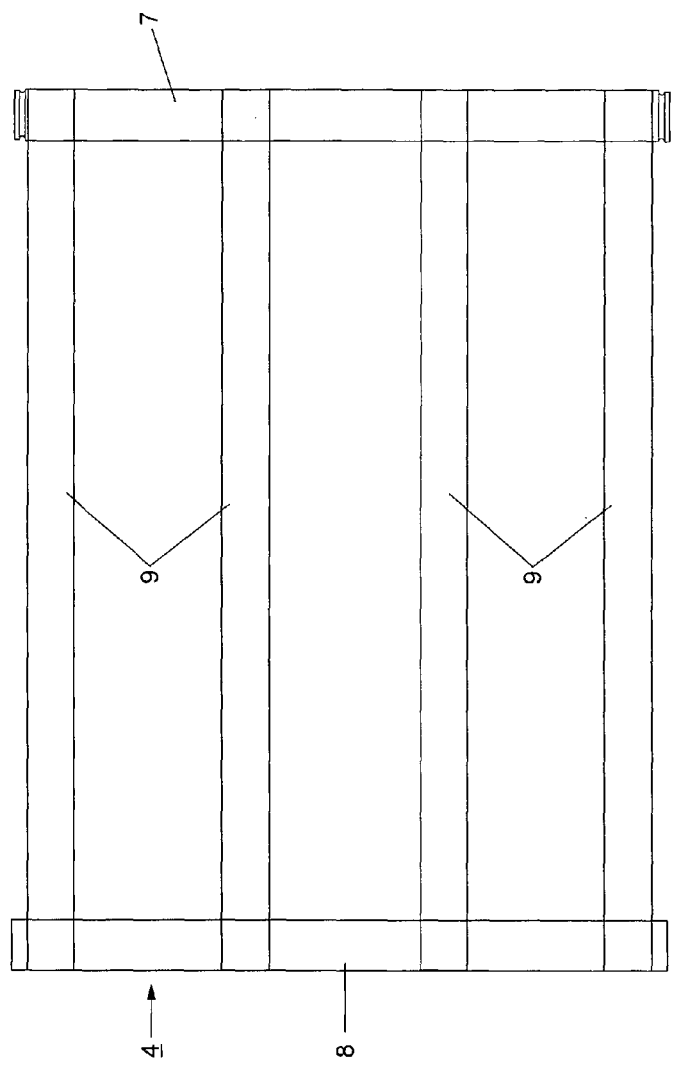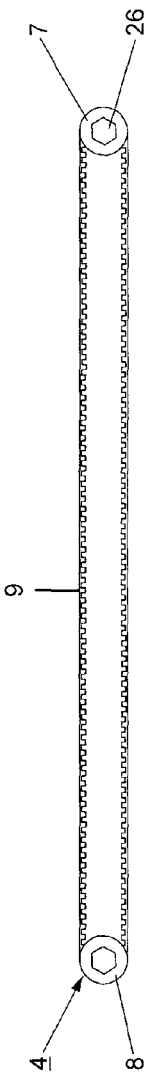

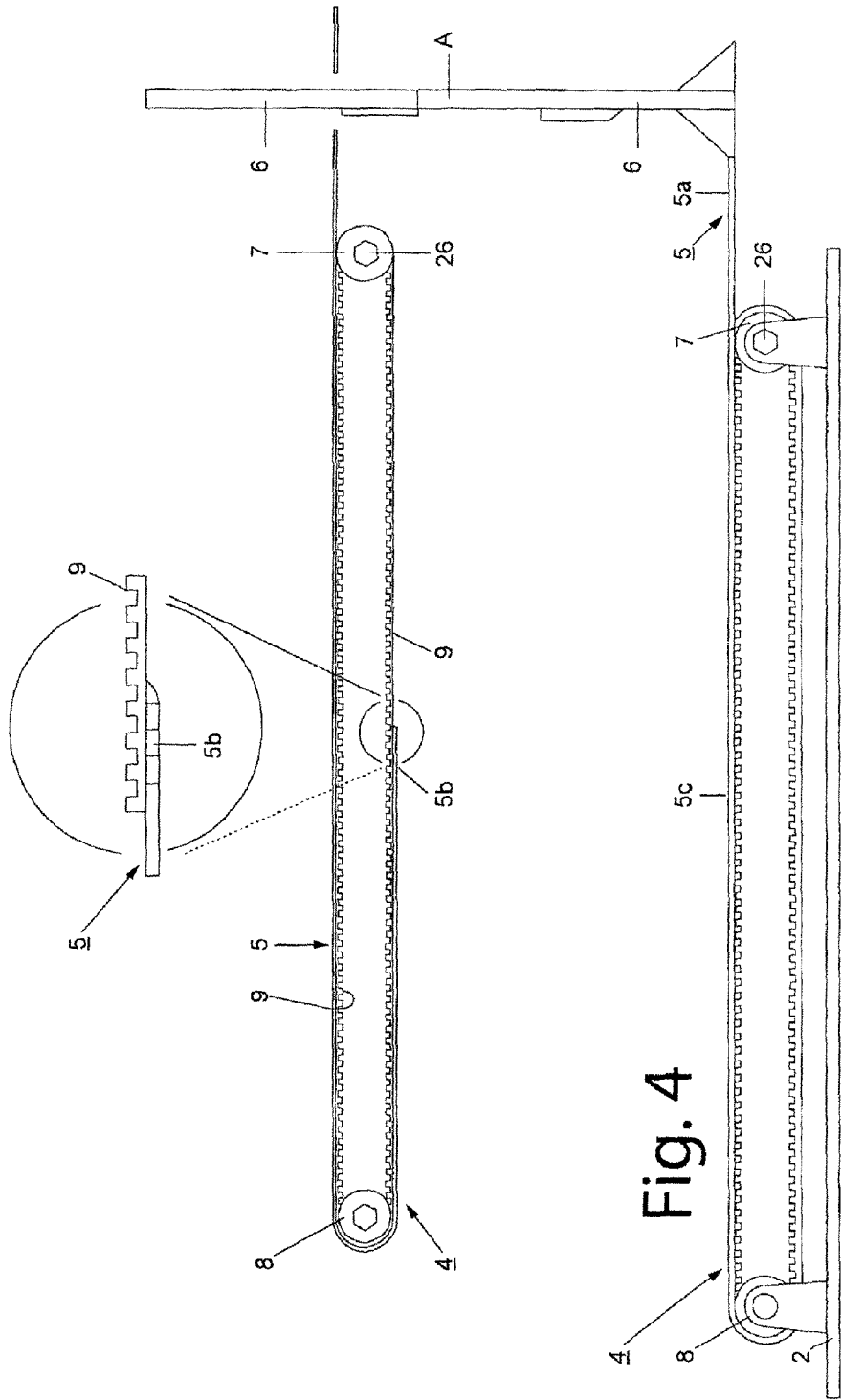

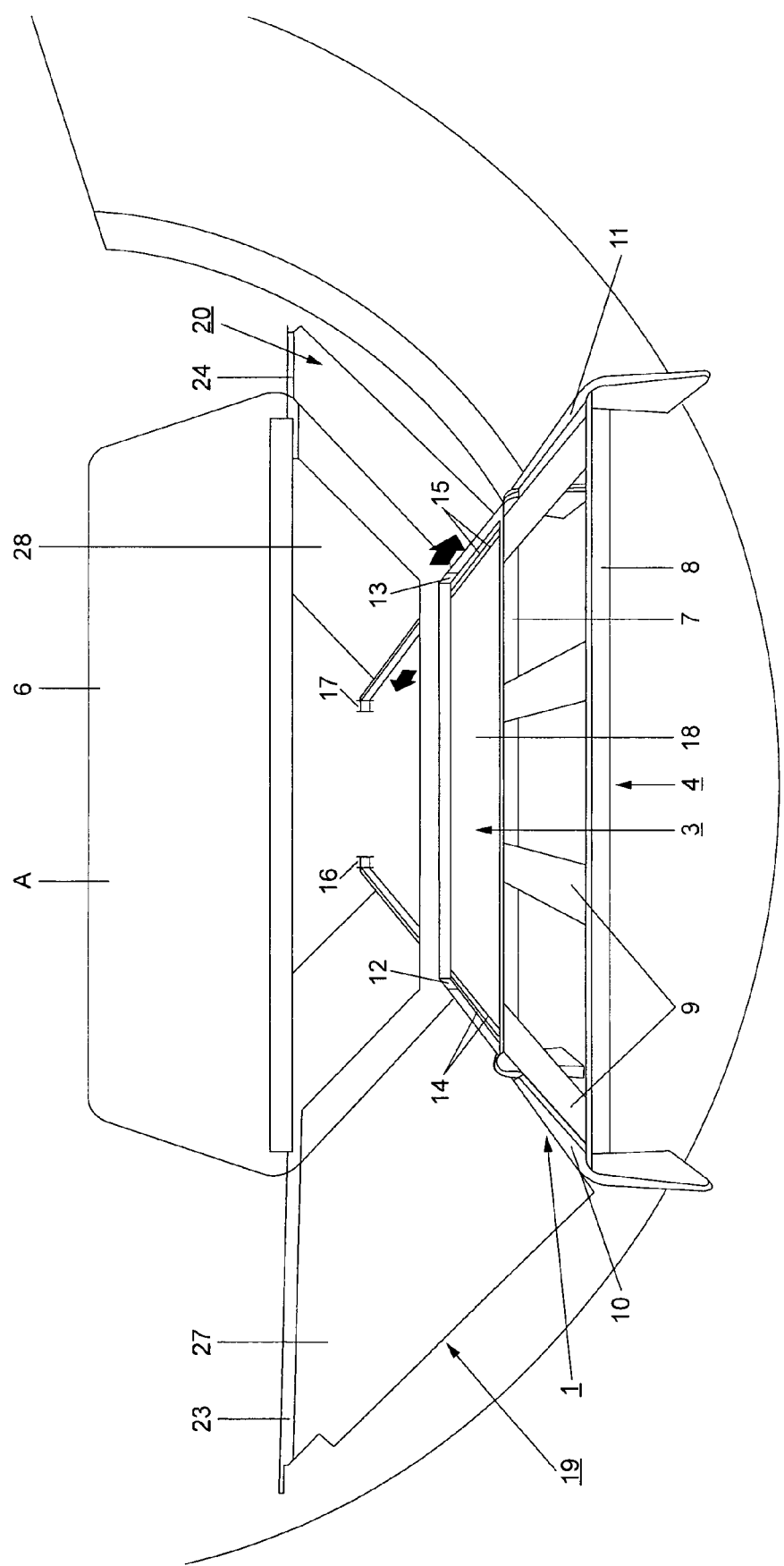

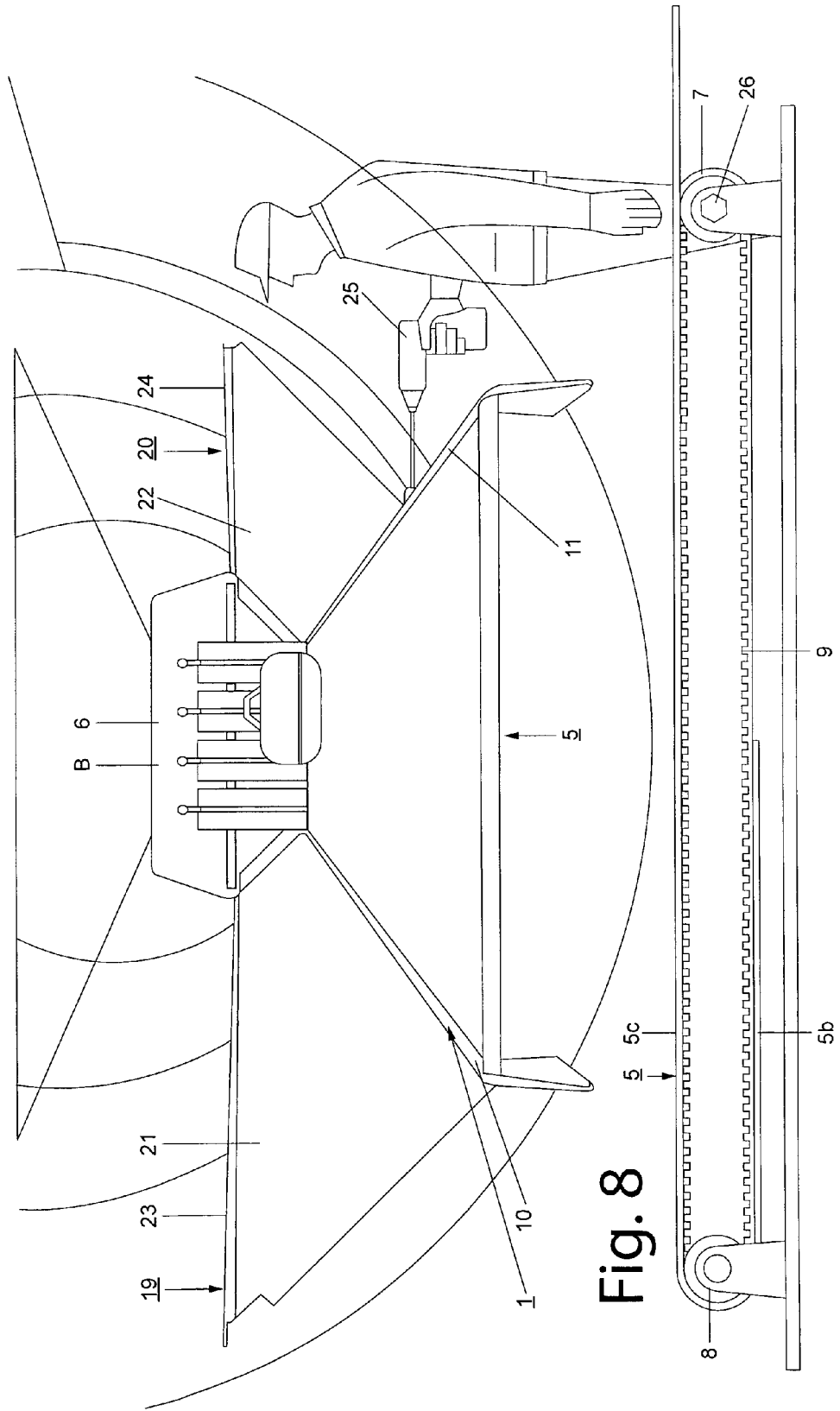

SYSTEM FOR TRANSPORTATION OF GOODS IN A LOADING SPACE

BACKGROUND TO THE INVENTION

The present invention relates to a system for transportation of goods in a loading space, which system comprises at least one conveyor running substantially parallel with the floor of the loading space, intended to have goods placed on it and drivable to and fro in the loading space.

Such a system for transportation of goods is often used in loading spaces which are difficult to have access to and to enter for the purpose of facilitating the loading and unloading of goods, preferably in loading spaces in passenger aircraft for easy loading and unloading of passengers' baggage. An example of such a system is referred to and described in U.S. Pat. No. 5,046,690.

An aspect which always requires attention in the case of aircraft is keeping their weight down to save fuel. Systems for transportation of goods in the loading space or spaces in an aircraft must also weigh as little as possible. Other aspects to be taken into account are that the various elements of the system should be easy and quick to fit, since the loading spaces here concerned are narrow and difficult to have access to, resulting in fitters having to perform their work in difficult positions, and that the requirements concerning the elements of the system should not be greater than those concerning the goods which the system is intended to transport.

BRIEF SUMMARY OF THE INVENTION

Accordingly, the object of the present invention is primarily to propose a system for transportation of goods which is quick and easy to fit, of low weight and easy to work with. The system is especially intended to be used for transportation of goods in aircraft but may of course also be used in other kinds of vehicles and in other loading spaces which are difficult to have access to and to enter elsewhere than in vehicles.

This object is achieved according to the invention by said conveyor comprising a first element in the form of a goods-bearing belt and a wall disposed transversely to the driving directions of the conveyor, the goods-bearing belt being fastened to the wall via a first end portion so that the wall serves as a stop for goods on the belt, the wall being movable between a first extreme position at or in the vicinity of an aperture to the loading space via which goods can be loaded onto and unloaded from the conveyor and a second extreme position at a far end of the loading space from said aperture, and a second element which is disposed at or in the vicinity of the aperture to the loading space as a continuation of said first element of the conveyor and to which the goods-bearing belt is fastened via a second end portion and, during movement of said transverse wall between said extreme positions, is unwindable and windable about two elongate rollers supported for rotation in the vehicle at a distance from one another, so) that the instantaneously uppermost strand of the goods-bearing belt wound round the rollers serves as a movable loading and unloading surface for goods between said rollers, and the conveyor is so configured as to allow movement of the transverse wall between said extreme positions and at the same time to unwind or wind the goods-bearing belt.

The system according to the invention weighs less than about 50 kg. When used in an aircraft, the system is easy to fit and remove at existing fastening points for such systems. No extra work need be done on the aircraft. Fitting and removal can be effected in about 5-10 minutes. The system also occupies very little of the height of the loading space, only about 25 mm, allowing maximum utilisation of the loading space.) The specific configuration of the second element of the conveyor also results in simple and readily accessible support of the goods-bearing belt close to the aperture to the loading space. All the unwinding and winding of the goods-bearing belt is therefore effected at the aperture to the loading space. The drivable elements of the conveyor for moving the wall and the goods-bearing belt will thus also be easy to reach, and external driving from the aperture to the loading space is possible.

Other objects and advantages of the invention will be apparent to one skilled in the art from studying the attached drawings and the detailed description set out below of preferred embodiments.

BRIEF DESCRIPTION OF THE DRAWINGS

FIG. 1 illustrates in schematic plan view the second element of the conveyor for the system according to the present invention before the fitting of the goods-bearing belt.

FIG. 2 illustrates said second element according to FIG. 1 in a corresponding schematic side view.

FIG. 3 depicts the second element in a schematic side view after the fitting of the goods-bearing belt but before fitting in a vehicle.

FIG. 3a depicts an enlargement of the anchoring of the belt to the second element.

FIG. 4 illustrates said second element in a schematic side view after fitting in a vehicle, with the goods-bearing belt wound round the second element and with the transverse wall at a first extreme position.

FIG. 5 depicts the system almost completely fitted in an aircraft, with the transverse wall at the first extreme position.

FIG. 7 depicts the system after completion of fitting in the aircraft and driving of the system to the second extreme position.

Finally, FIG. 8 depicts said second element of the conveyor for the system in a schematic side view after fitting in a vehicle, with the goods-bearing belt wound out and the transverse wall at the second extreme position.

DETAILED DESCRIPTION OF PREFERRED EMBODIMENTS OF THE INVENTION

Figure 6:
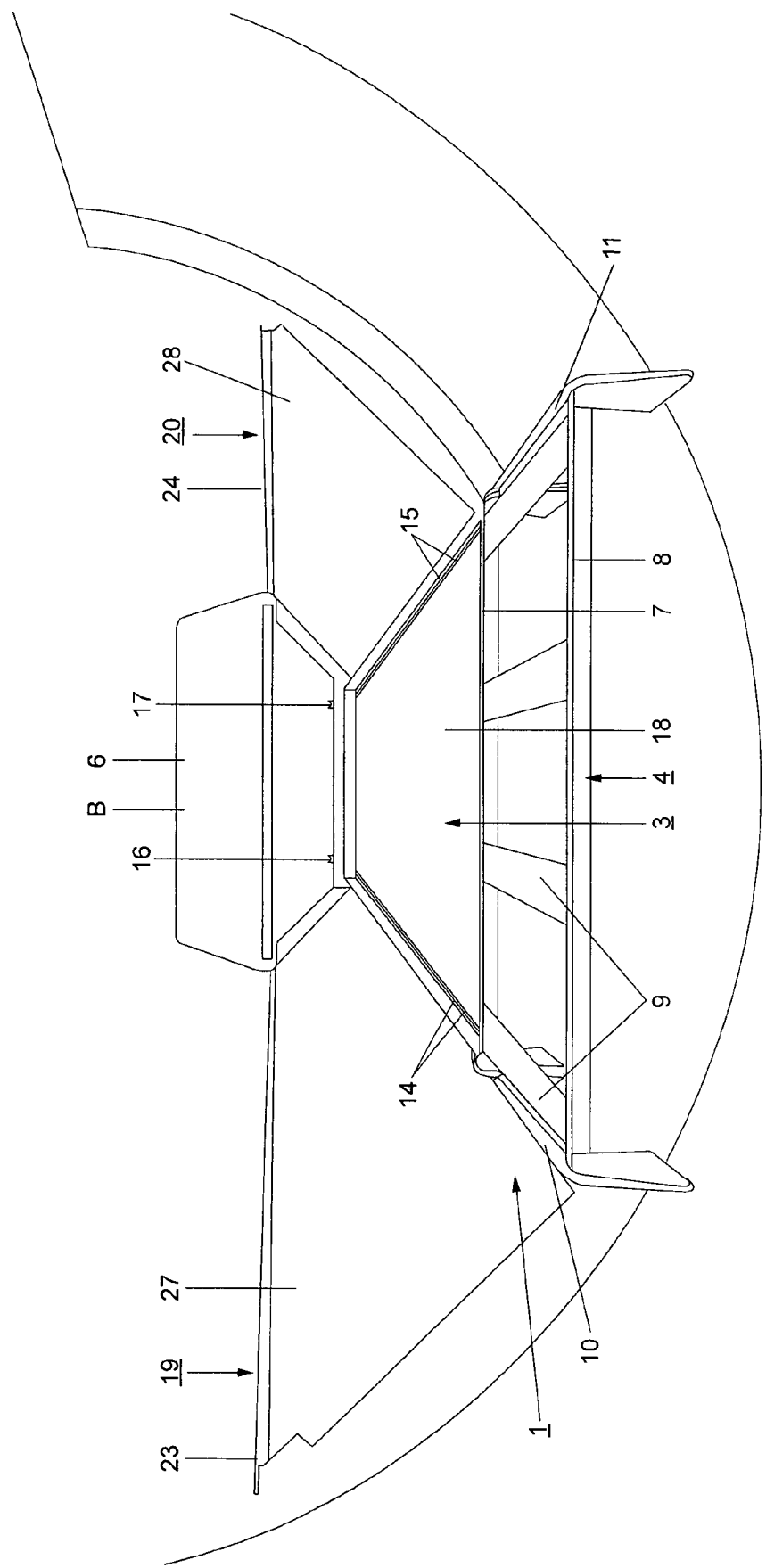
FIG. 6 is a view corresponding to FIG. 5 but with the transverse wall at a second extreme position.

The drawings thus depict a system for transportation of goods in a loading space in a vehicle. The system is preferably intended for loading spaces in aircraft and therein especially for loading spaces for passengers' baggage in passenger aircraft. The system comprises at least one conveyor 1 which runs substantially parallel with the floor 2 of the loading space and preferably also in the longitudinal direction of the loading) space (see preferably FIGS. 5-7). In the version depicted, the conveyor 1 covers the whole width of the floor 2. If the loading space is very wide, a plurality of the conveyors 1 may be disposed alongside one another. Similarly, a plurality of the conveyors 1 may be disposed in line after one another in cases where the loading space is very long. Goods, e.g. passengers' baggage, are to be placed on the conveyor 1. The conveyor 1 is also so configured that it is drivable to and fro in the loading space.

According to the invention, the conveyor 1 comprises a first element 3 and a second element 4. The first element 3 comprises an elongate goods-bearing belt 5 for said goods, e.g. said baggage. A wall 6 is so placed that it runs in a transverse direction relative to the driving directions of the conveyor 1, i.e. across the whole width of the goods-bearing belt 5. The belt 5 is fastened via a first end portion 5a of it to the wall 6 (see FIG. 4). The wall 6 can thus serve as a stop for goods on the belt 5. The transverse wall 6 is also movable between a first extreme position A (see FIGS. 4 and 5) at or in the vicinity of an aperture to the loading space via which goods can be loaded onto and unloaded from the conveyor 1 and a second extreme position B (see preferably FIGS. 6 and 7) at a far end of the loading space from said aperture.

According to the invention, the second element 4 of the conveyor 1 is disposed at or in the vicinity of the aperture to the loading space as a continuation of the first element 3, i.e. in line with the latter as seen in the driving directions of the conveyor. The goods-bearing belt 5 is fastened via its second end portion 5b to the second element 4 (see preferably FIG. 3a). At the second element 4, the goods-bearing belt 5 is) also unwindable and windable when the transverse wall 6 is moved between said extreme positions A, B (see FIGS. 4 and 8).

Finally, the conveyor 1 is so configured as to allow movement of the transverse wall 6 between said extreme positions A, B. The goods-bearing belt 5 will thus at the same time be unwound or wound.

With a view to being situated at or in the vicinity of the aperture to the loading space, the second element 4 of the conveyor 1 is so configured that the goods-bearing belt 5 forms on it a movable loading and unloading surface for goods. This loading and unloading surface thus preferably runs, as in the version depicted (FIG. 7), across the whole width of the aperture. The loading and unloading surface changes at the first) element 3 to a surface formed by the belt 5 which may be referred to as a transporting and storage surface.

In the version illustrated in the drawings, the second element 4 of the conveyor 1 comprises two elongate rollers 7 and 8 about which the goods-bearing belt 5 is unwindable and windable. The rollers 7, 8 are supported for rotation in the vehicle, preferably in the floor 2, at a distance from one another. The instantaneously uppermost strand 5c of the goods-bearing belt 5 wound round the rollers 7, 8 thus constitutes the aforesaid loading and unloading surface between these rollers. One or more, in the version depicted four, toothed strips 9 (see preferably FIG. 1) run between the rollers 7, 8. The configuration of the rollers 7, 8 is appropriate to this purpose, e.g. provided with corresponding tooth recesses (not depicted). The aforesaid second end) portion 5b of the goods-bearing belt 5 is fastened to said at least one toothed strip 9, e.g. by being sewn and/or adhesively bonded. The rollers 7, 8 also preferably comprise at least partly a friction-increasing surface resulting in good friction relative to the goods-bearing belt 5.

At least one of the rollers 7, 8, here the roller 7, is drivable in rotation by a suitable type of drive device (not depicted) which is separate from the vehicle's electrical system. The drive device may be an external drive device, e.g. a battery-powered screwdriver 25 (FIG. 7). The drivable roller 7, which is with advantage made of carbon fibre or titanium in order to be of low weight and great strength, comprises a fitting bracket, e.g. a recess 26 at one or both ends of the roller, to accommodate the) drive device. The drive device may also be mechanical.

The first element 3, also possibly the second element 4 of the conveyor 1, comprises at least two profiled sections 10 and 11 fitted in the loading space of the vehicle. In the version depicted, the sections 10, 11 may be fitted in the floor 2 of the loading space, but also, for example, in the lower portion of the sidewalls of the loading space. Alternatively the sections 10, 11 may simply be laid unfastened on rubber on the floor of the loading space and be held in place solely by the weight of the goods on the conveyor. In the version depicted, the sections 10, 11 run in the longitudinal direction of the loading space. Each of the sections 10, 11 has running on it a respective carriage 12, 13 for the transverse wall 6. Accordingly, the wall 6 comprises with advantage a) section (not depicted) with fitting portions for mounting on the respective carriage 12, 13. The respective sections also support the panels which, above each section, constitute said wall 6. The respective carriages 12, 13 are drivable for movement and guidance of the wall 6 between its extreme positions A, B. In the version depicted, each of the carriages 12, 13 is drivable by being in communication with the drivable roller 7 via a driving means, preferably, in the version depicted, a driveline 14, 15 made preferably of Kevlar or stainless steel. Each driveline 14, 15 runs from the respective carriage 12, 13 round a rotatable pulley 16, 17 situated with advantage at the aforesaid far end of the loading space for optimum utilisation of that space. Each driveline 14, 15 runs from the respective pulley 16, 17 to the drivable roller 7 and back therefrom to the respective carriage 12, 13. The drivelines 14, 15 thus constitute endless loops with) their ends fastened in the respective carriages 12, 13. The pulleys 16, 17 are preferably supported for rotation at one end, the far end, of the sections 10, 11, and the drivelines 14, 15 preferably run partly within and partly on top of said sections but in the latter case also under the goods-bearing belt 5. To improve the driving engagement between the drivelines 14, 15 and the drivable roller 7, each driveline runs with advantage several turns round the respective pulley, which is with advantage provided with a groove (not depicted) for the driveline. As an alternative to the carriages 12, 13, it is conceivable to connect the drivelines 14, 15 directly to the wall 6 and in that case via the respective section. The goods-bearing belt 5 is with advantage also connected to the wall 6 via said section. Instead of driving means in the form of drivelines 14, 15, it is possible, for) example, to use toothed strips (not depicted) which then cooperate with corresponding toothed recesses in the drivable roller 7.

The goods-bearing belt 5 is preferably so disposed that it is substantially free from abutment against parts of the vehicle between the sections 10, 11, i.e. against the floor 2 of the loading space, but a friction fabric 18 is disposed on the vehicle between said sections to reduce the friction arising from any possible abutment against said vehicle parts.

As indicated above, the system according to the present invention may also comprise, for example, two conveyors 1, the second element 4 of each conveyor being preferably disposed at the aperture to the loading space in such a way as to occupy) substantially half of the width of the aperture. FIGS. 4 and 5 depict the transverse wall 6 at a first extreme position A in the vicinity of the aperture to the loading space, close to the drivable roller 7. If so desired, however, the transverse wall 6 may be moved to a first extreme position at the aperture to the loading space corresponding to any position along the second element 4 from the drivable roller 7 to the vicinity of the second roller 8. It is desirable, for example, for the system according to the invention to comprise two conveyors 1 with their respective second elements 4 situated adjacent to one another, since this makes it possible, when necessary, to use the goods-bearing belt 5 and the transverse wall 6 to transfer goods from one conveyor to the other.

The system according to the invention also preferably comprises two side tracks 19 and 20 each running on its respective side of the respective conveyor 1 (see FIGS. 5-7). These side tracks 19, 20 are primarily intended to prevent goods loaded in the loading space of the vehicle and situated on the goods-bearing belt 5 from sliding towards insides of the loading space during movement. The side tracks 19, 20 are with advantage provided with endless belts 21, 22 which run round rollers (not depicted) supported for rotation and each having its end fastened on the respective side of the transverse wall 6, preferably to the respective section, so that the endless belts follow the movement of the wall to and fro between the extreme positions A, B. Alternatively, the endless belts 21, 22 may be disposed about the rollers without being driven by the transverse wall 6, but being instead movable by goods on the goods-bearing belt 5 during movement of the goods if the friction relative to the endless belts is sufficient.) The belts 21, 22 of the side tracks 19, 20 are with advantage held in position and guided by sections 23 and 24 mounted on the insides of the loading space and preferably by the sections 10, 11 for the conveyor 1. The side track 20 on the same side as the aperture to the loading space is shorter in way of the opening than the side track 19 on the other side of the conveyor 1. In the version with two conveyors 1 and associated side tracks 19, 20, substantially half of the width of the aperture is preferably covered by the respective side track 19 on the opposite side from the aperture to the loading space, as also the respective conveyor.

Likewise concerning the conveyor 1, friction fabrics 27, 28 are disposed internally on the walls of the vehicle's loading space under the respective endless belts 21, 22) and between the two strands of the endless belt. The movement of the belts 21, 22 is thus facilitated.

Both the respective goods-bearing belt 5 and the belts 21, 22 are preferably made of TEFLON but may of course also comprise some other suitable material.

Where side tracks 19, 20 are provided, the transverse wall 6 runs, as indicated above, across both a goods-bearing belt 5 and across the respective endless belts 21, 22. At the same time, carriages (not depicted) for the transverse wall 6 preferably also run on the sections 23, 24.

In brief, the system described above and depicted in the drawings functions as follows:

Goods are placed on the loading and unloading surface of the second element 4) of the conveyor 1, i.e. on the uppermost strand 5c of the goods-bearing belt 5. The drivable roller 7 is activated to draw the carriages 12, 13 and hence the transverse wall, 6 via the drivelines 14, 15 and the pulleys 16, 17, towards the far end of the loading space (from position A according to FIG. 1). The goods-bearing belt 5, which is of course fastened to the transverse wall 6, accompanies the movement of the latter and is unwound from the rollers 7, 8 of the second element 4 and out from said second element of the conveyor 1, thereby transferring the goods from the second element to the conveyor's first element 3 lying on the belt, which here serves as said transporting and storage surface. Loading of goods continues as above until the transverse wall 6 reaches position B according to FIG. 2 and the loading space is full.

Unloading of goods is effected in reverse sequence from position B to position A by reversing the direction of rotation of the drivable roller 7 and thereby causing the goods-bearing belt 5 to be wound instead round the rollers 7, 8 in the second element 4 of the conveyor 1. This also results in the transverse wall 6 being drawn, via the carriages 12, 13 and the drivelines 14, 15, towards the second element 4 of the conveyor 1.

It will be obvious to one skilled in the art that the system described above for transportation of goods in a loading space of a vehicle can be modified and altered within the scopes of the claims set out below without departing from the idea and object of the invention. As indicated above, the number of the conveyors may vary depending) on the size of the loading space and, to some extent, on how the conveyors are disposed in the loading space. The choice of materials and the implementation of the constituent parts of the conveyors may also vary. Alternatively, the system may also be driven via a roller or pulley other than the roller 7, e.g. from the roller 8 or the pulleys 16, 17, or else the system may be driven in some other suitable manner via other constituent parts or components of the system.

The invention claimed is:

1. A system for transportation of goods in a loading space, which system comprises at least one conveyor (1) running substantially parallel with the floor (2) of the loading space, intended to have goods placed on it and drivable to and fro in the loading space, wherein the conveyor (1) comprises:

a first element (3) comprising a goods-bearing belt (5) and a wall (6) disposed transversely to the driving directions of the conveyor (1), the goods-bearing belt being fastened to the wall via a first end portion (5a) so that the wall serves as a stop for goods on the belt, the wall being movable by means of a drive device and drive means (14, 15) between a first extreme position (A) at or in the vicinity of an aperture to the loading space via which goods can be loaded onto and unloaded from the conveyor, and a second extreme position (B) at a far end of the loading space from said aperture, and a second element (4) which is disposed at or in the vicinity of the aperture to the loading space as a continuation of said first element (3) of the conveyor (1) and to which the goods-bearing belt (5) is fastened via a second end portion (5b) which through at least one toothed strip (9) cooperates with two elongate rollers (7, 8) forming part of said second element and supported for rotation in the loading space at a distance from one another and about which, during movement of said transverse wall (6) between said extreme positions (A, B), said good-bearing belt being unwindable and windable so that the instantaneously uppermost strand (5c) of the goods-bearing belt (5) wound about the rollers serves as a movable loading and unloading surface for goods between said rollers, and at least one (7) of said elongate rollers (7, 8) being drivable in rotation by the drive device for moving the transverse wall (6) via the drive means (14, 15), wherein said drive means extend from said transverse wall to said far end of the loading space and therefrom around the drivable roller (7) and from said drivable roller (7) back to said wall between said extreme positions (A, B), and wherein movement of the wall unwinds or winds the goods-bearing belt (5).

2. A system according to claim 1, wherein said at least one (7) of the rollers (7, 8) is drivable in rotation by a drive device which is separate from the vehicle's electrical system.

3. A system according to claim 1, wherein said first element (3) of the conveyor (1) comprises at least two sections (10, 11) which are fitted in the loading space of the vehicle and on each of which a carriage (12, 13) for the transverse wall (6) runs and is drivable for movement of said wall (6) between the extreme positions (A, B) of the wall.

4. A system according to claim 3, wherein each carriage (12, 13) for the transverse wall (6) is in communication via the drive means (14, 15) with the drivable roller (7) for movement of said wall between the extreme positions (A, B) of the wall.

5. A system according to claim 4, wherein each drive means (14, 15) from the respective carriage (12, 13) runs round a rotatable pulley (16, 17) at said far end of the loading space and from the respective pulley to the drivable roller (7) and back therefrom to the respective carriage.

6. A system according to claim 5, wherein said pulleys (16, 17) are supported for rotation at one end of said sections (10, 11).

7. A system according to claim 4, wherein the respective drive means (14, 15) run substantially within said sections (10, 11).

8. A system according to claim 4, wherein each drive means (14, 15) runs several turns round the drivable roller (7) for increased driving engagement therewith.

9. A system according to claim 3, wherein the loading space is in a vehicle, a friction fabric (18) being disposed on the vehicle between said sections (10, 11) to reduce friction between the goods-bearing belt (5) and vehicle parts between said sections.

10. A system according to claim 1, wherein the system comprises two conveyors (1), and said second element (4) of each conveyor is disposed at the aperture to the loading space in such a way as to occupy half of the width of the aperture.

11. A system according to claim 1, wherein the system also comprises two side tracks (19, 20) each running on its respective side of the respective conveyor (1) to prevent goods loaded on the conveyor from sliding towards the insides of the loading space during movement.

12. A system according to claim 11, wherein said side tracks (19, 20) are provided with endless belts (21, 22) running round rotatable rollers, a portion of each endless belt (21, 22) being fastened on the respective side of the transverse wall (6).

13. A system according to claim 12, wherein friction fabrics (27, 28) are disposed internally on the walls of the vehicle's loading space under the respective endless belts (21, 22) and between the two strands of each endless belt to facilitate the movement of the belts.

14. A system according to claim 12, wherein both the respective goods-bearing belts (5) and the endless belts (21, 22) are made of Teflon.

15. A system according to claim 12, wherein the transverse wall (6) runs both across a goods-bearing belt (5) and across the respective endless belts (21, 22).

16. Using a system according to claim 1 for transportation of goods in a loading space in a vehicle.

17. Using a system according to claim 1 for transportation of goods in a loading space in an aircraft, preferably for transportation of baggage in a loading space of a passenger aircraft.

18. A system according to claim 1, wherein movement of the transverse wall between the extreme positions changes a length of the goods-bearing belt in the driving directions of the conveyor.

19. A system according to claim 1, wherein the first end portion of the goods-bearing belt terminates at the wall such that the first end portion does not extend on both sides of the wall.

20. The system according to claim 1, wherein the goods-bearing belt and the drive means are spaced from and unsecured to one another.

21. The system according to claim 1, wherein the at least one toothed strip is secured to the second end portion of the goods-bearing belt.

22. A system having a conveyor for transporting goods in a loading space having a floor and extending between a front end where goods are loaded on the conveyor and a rear end comprising:
   a first element including a goods-bearing belt and a wall extending vertically from the goods-bearing belt such that the goods-bearing belt extends in a single direction from the wall;
   a second element including a pair of rollers and at least one toothed strip extending around and between the pair of rollers, the goods-bearing belt having a first end extending around one of the rollers and being secured to the least one toothed strip and having a second end secured to and terminating at the wall, at least one of the pair of rollers being drivable in rotation for causing movement of the strip to wind and unwind the goods-bearing belt on one of the rollers; and
   drive means extending around and between the drivable roller and at least one pulley positioned at the rear end of the loading space, driving the drivable roller causes the drive means to move the wall between the front end and rear end of the loading space.

23. The system according to claim 22, wherein the goods-bearing belt and the drive means are spaced from and unsecured to one another.

* * * * *